July 1, 1930.  H. PRENTICE  1,769,388
METHOD OF AND APPARATUS FOR FILTERING VISCOUS MATERIAL
Filed May 2, 1928  2 Sheets-Sheet 1
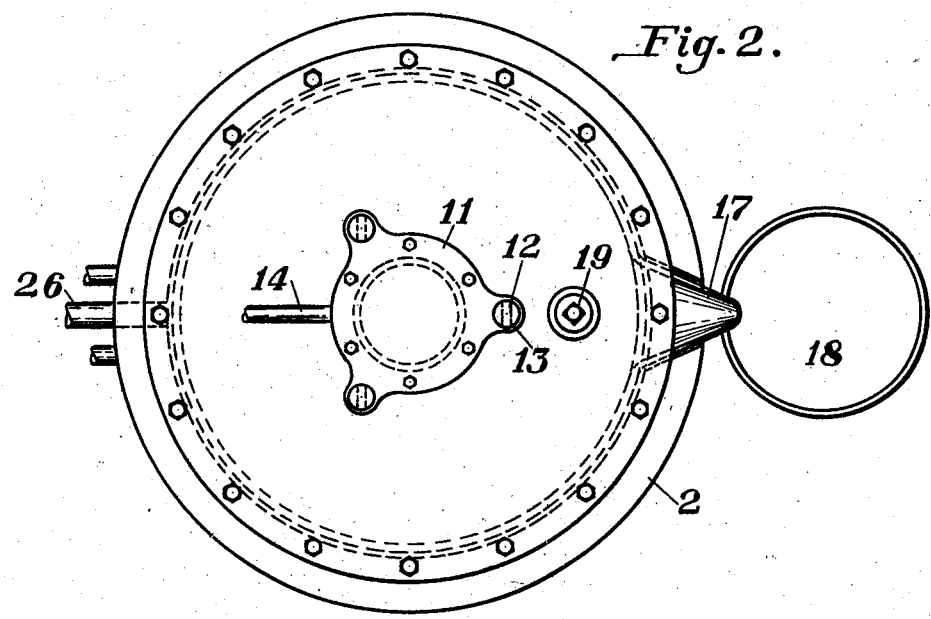
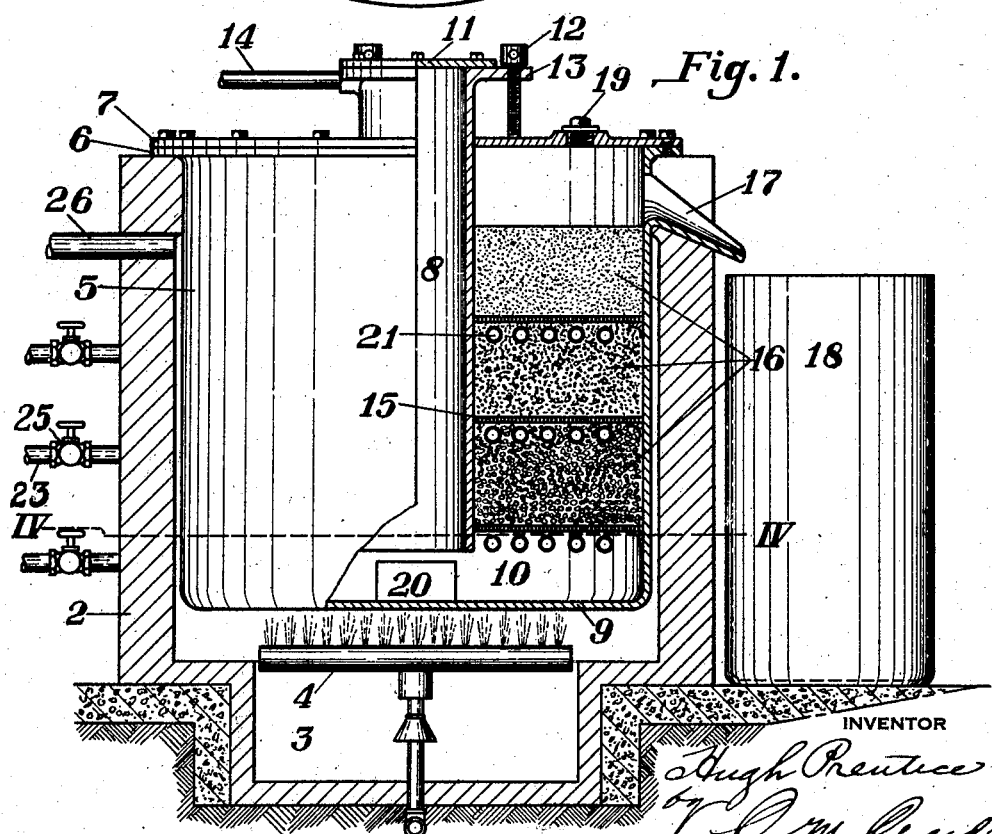
INVENTOR July 1, 1930. H. PRENTICE 1,769,388
METHOD OF AND APPARATUS FOR FILTERING VISCOUS MATERIAL
Filed May 2, 1928 2 Sheets-Sheet 2

INVENTOR
Hugh Prentice

Patented July 1, 1930

1,769,388

UNITED STATES PATENT OFFICE

HUGH PRENTICE, OF PITTSBURGH, PENNSYLVANIA

METHOD OF AND APPARATUS FOR FILTERING VISCOUS MATERIAL

Application filed May 2, 1928. Serial No. 274,665.

My invention consists of an improvement in filters for viscous material for the purpose of eliminating impurities therefrom by use of the mechanism in carrying out the method involved herein.

The invention is particularly adapted to the manufacture of varnish and similar material or substance derived from natural deposits, as gums and the like, for use in the arts. In the particular art of varnish-making, the gums or resins forming the raw material or base are procured to a large extent from natural sources and often contain or embody considerable earthy or other insoluble foreign matter. While such impurities may be removed from the finished product when in liquid form, considerable difficulty is usually experienced in eliminating such foreign matter when the finished product is in a solid condition.

My invention consists in the method of treating the material by heat and fluid pressure, in connection with suitable filtering mediums, utilizing the apparatus constructed and arranged for operation in the manner more fully hereinafter described.

In the drawings illustrating certain preferred embodiments of means for practicing the invention:

Fig. 1 is a vertical sectional view of an apparatus for carrying out the invention, in normal position for operation;

Fig. 2 is a plan view of Fig. 1;

Figure 4:
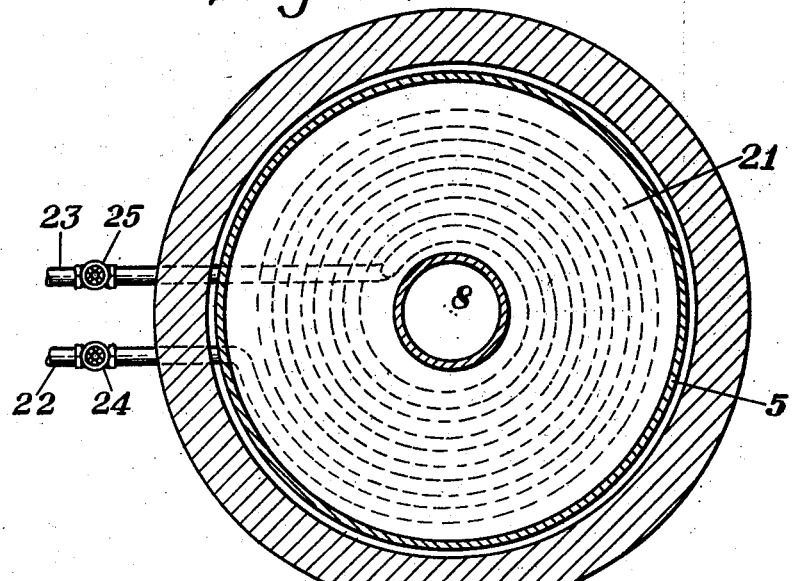
Fig. 4 is a horizontal sectional view on the line IV—IV of Fig. 1.

In the drawings, 2 is an outer enclosing wall or casing of suitable refractory material, as brick or the like, constituting a furnace chamber provided at its bottom with a depression or well 3 within which is located a burner 4 of any suitable construction for the combustion of gas or other fuel. Within the chamber surrounded by the casing 2, spaced therefrom for circulation towards an outlet flue 26, is a filtering vessel 5. Said vessel may be either cylindrical, square, or of other suitable form, resting upon the top of wall 2 by upper terminal flange 6 or otherwise, and provided with a closing cover or top 7.

Centrally arranged within the vessel 5 is the supply well or conduit 8 extending through the top 7, closed at the top and open at the bottom, the open lower end terminating a short distance above the bottom 9 of the vessel, and freely communicating with the bottom compartment 10 thereof. Conduit 8 is provided with a cover 11 at its top secured by bolts or other suitable means and is adapted to be raised or lowered through the vessel by any suitable means, for adjustment therein.

Figure 3:
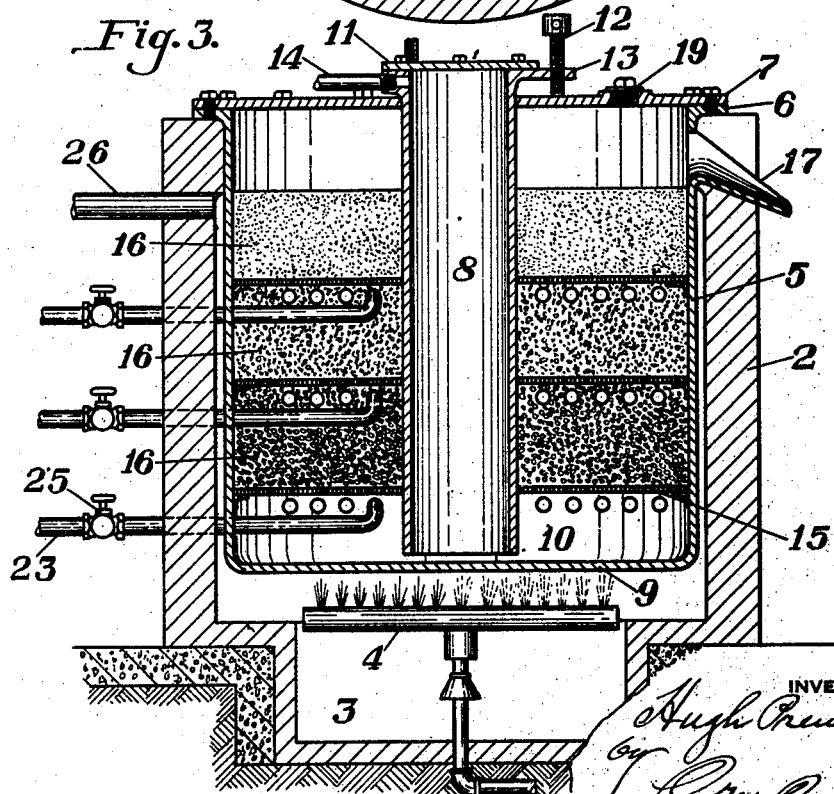
Fig. 3 is a vertical sectional view similar to Fig. 1, showing the central supply well lowered.

In the drawings, I show a plurality of temper screws 12 extending downwardly through lugs 13 of the conduit 8 and engaging the top 7. By adjustment of the temper screws the conduit may be elevated to the position shown in Fig. 1, or lowered to the position shown in Fig. 3, or to any intermediate position, as desired. The upper end of conduit 8 is provided with an air pressure pipe 14 for the purpose of supplying compressed air to the interior and its contents.

Extending transversely across the vessel 5 at different levels are a series of grids or perforated plates 15, each supporting a superimposed mass of filtering medium 16, of any suitable material, as cracked stone or the like, through which the material to be treated will pass upwardly in its progress. The filtering material is preferably of varying coarseness, whereby to cumulatively act on the upwardly flowing current of material to be filtered, in its progress toward a lateral overflow outlet gutter or channel 17, leading off from the upper portion of the vessel 5 for delivery into a receiving receptacle 18 for filtered material.

The cover 7 is provided with an opening and closing hole 19 through which any suitable solvent or wash for the filtering medium may be introduced, thus permitting the filtering medium to be used successively for a considerable time without renewal. The bottom of the vessel 5 is provided with a clean-out door 20 through which any foreign matter eliminated and precipitated may be removed from time to time.

In addition to the temperatures generated by burner 4, additional means are preferably provided for heating the interior of the vessel 5 and its contents, as by circulating coils 21 having inlet and outlet pipes 22—23 provided with control valves 24 and 25, as in Fig. 4.

With the machine as thus constructed, it will be seen that the material to be treated, as raw varnish gum, resin, or the like, in a melted condition, may be introduced at the top of the central conduit 8 by removal of the cover 11, after which the cover is then tightly replaced. After sufficient time and subjection to the generated heat, with resulting melting of the gum, it will rise upwardly from chamber 10 through the grids and the serial sections of filtering mediums 16, to the level of the contents of the conduit 8.

Thereafter, sufficient heat treatment having been maintained, upon application of air pressure by pipe 14 to the interior of the conduit 8, the column of material in the conduit will be forced downwardly therein and gradually upwardly through the filtering mediums. Any foreign material carried in suspension will be collected and separated, the refined liquid passing finally out through conduit 17 into the tank 18. As the operation proceeds, the conduit 8 may be gradually lowered until its bottom is closely adjacent to the bottom 9 of vessel 5 as in Fig. 3, so that the final remaining contents of the conduit will be forced laterally from its bottom in a thin film. Due to the air pressure in conduit 8 the material being treated will rise upwardly through the mediums 16 for final discharge, effecting a practically complete circulation of the entire mass, with accompanying elimination and precipitation of foreign matter. The latter is removed by washing or other separation from the mediums 16 and discharged from time to time through the clean-out door 20.

It will be understood that the degree of temperature generated by the gas burner 4 may be accurately controlled, as may also the supplemental or additional heating action of coils 21, by the passage therethrough of steam or other heating fluid, to the desired degree under the control of the operator.

Also, that any other heating medium may be utilized, and that the number of the grids 15, the filtering material mediums 16 and number of its units, and various other features of the apparatus, as well as its dimensions, design, or other details, may be variously changed or modified by the skilled mechanic in applying the invention, but that all such changes are to be considered as within the scope of the following claims.

What I claim is:

1. In a filtering apparatus for viscous material, a casing having a series of transverse supporting grids provided with filtering material, a central supply conduit leading to the bottom of the casing, means for lowering the conduit towards the casing bottom, and means for supplying fluid pressure to the upper portion of the conduit.

2. In a filtering apparatus for viscous material, a casing having a series of transverse supporting grids provided with filtering material, a central supply conduit leading to the bottom of the casing and having a closing top, means for supplying fluid pressure to the upper portion of the conduit, and means for varying the vertical position of the conduit.

3. In a filtering apparatus for viscous material, a casing having a series of transverse supporting grids provided with filtering material, a central supply conduit leading to the bottom of the casing, means for lowering the conduit towards the casing bottom, means for supplying fluid pressure to the upper portion of the conduit, an outer enclosing casing, and means for heating the casing and its contents.

4. In combination with an outer enclosing wall, a filtering casing therein having a series of transverse supporting grids and a lower open area, a central vertically movable supply conduit having a removable top and an air pressure supply, a lowermost burner within the base portion of the wall, and an overflow spout leading off from the casing through the wall.

5. In combination with an outer enclosing wall, a filtering casing therein having a series of transverse supporting grids and a lower open area, a coil of heating pipe arranged below one or more of the grids, filtering material supported on the grids, a central vertically movable supply conduit having a removable top and an air pressure supply, a lowermost burner within the base portion of the wall, and an overflow spout leading off from the casing through the wall.

In testimony whereof I hereunto affix my signature.

HUGH PRENTICE.